United States Patent [19]

Inoue et al.

[11] Patent Number: 5,112,885
[45] Date of Patent: May 12, 1992

[54] ROOM TEMPERATURE VULCANIZABLE SILICON RUBBER COMPOSITION

[75] Inventors: Yoshio Inoue; Masatoshi Arai, both of Annaka; Hironao Fujiki, Takasaki, all of Japan

[73] Assignee: Shin-Etsu Chemical Co., Ltd., Japan

[21] Appl. No.: 515,028

[22] Filed: Apr. 26, 1990

[30] Foreign Application Priority Data

Apr. 28, 1989 [JP] Japan ................... 1-110192

[51] Int. Cl.$^5$ ............................. C08K 9/06
[52] U.S. Cl. ......................... 523/213; 523/212; 524/847
[58] Field of Search ............... 523/213, 212; 524/847

[56] References Cited

U.S. PATENT DOCUMENTS

| | | | |
|---|---|---|---|
| 3,090,765 | 3/1963 | Nitzsch et al. | 524/847 |
| 3,868,345 | 2/1975 | Kratel et al. | 523/212 |
| 4,043,969 | 8/1977 | Sporck | 523/213 |
| 4,341,842 | 7/1982 | Lampe | 524/714 |
| 4,360,610 | 11/1982 | Murray et al. | 523/212 |
| 4,384,068 | 5/1983 | Bouverot et al. | 524/588 |
| 4,985,477 | 1/1991 | Collins et al. | 523/213 |

FOREIGN PATENT DOCUMENTS 40-19178 8/1965 Japan.
47-30422 8/1972 Japan.

Primary Examiner—Melvyn I. Marquis
Assistant Examiner—Karen A. Hellender
Attorney, Agent, or Firm—Lowe, Price, LeBlanc & Becker

[57] ABSTRACT

A room temperature vulcanizable silicone rubber composition is described. The composition comprises an organopolysiloxane which is blocked with a hydroxyl group or hydrolyzable group at ends of the molecular chain thereof, fumed silica which is surface treated with a monoorganosilane of the general formula, $R^1SiY_3$, or a monoorganopolysilazane of the general compositional formula, $R^1Si(NH)_{3/2}$, wherein $R^1$ in each formula represents a monovalent hydrocarbon group and each Y represents a hydrolyzable group and which has a specific area of not less than 50 m$^2$/g, and an organosilicon compound of the general formula, $R^2{}_lSiZ_{4-l}$, wherein $R^2$ represents an unsubstituted or substituted monovalent hydrocarbon group, Z represents a hydrolyzable group, and l is a value of 0 or 1, or its partially hydrolyzed product. The composition may further comprise a promoter for the vulcanization.

11 Claims, 1 Drawing Sheet

ROOM TEMPERATURE VULCANIZABLE SILICON RUBBER COMPOSITION

BACKGROUND OF THE INVENTION

1. Field of the Invention

This invention relates to a vulcanizable composition and more particularly, to a room temperature vulcanizable silicone rubber composition which is capable of yielding a vulcanized product having good characteristics with respect to water resistance, adhesion in hot water, resistance to LLC (long life coolant), resistance to engine oil and releasing properties and the like.

2. Description of The Prior Art

Room temperature vulcanizable compositions chiefly composed of silicones have wide utility in various fields such as of sealing materials for building, adhesives, sealants such as a gasket of automobile, coatings and the like.

The characteristics required for the room temperature vulcanizable composition mainly composed of silicones recently become more severe. For instance, with respect to sealing materials for buildings, a so-called structure glazing technique wherein a heat ray reflective glass is sealingly bonded to outer walls by the use of a silicone sealing material has been developed, or applications as a sealing material in contact with water is increasing. This requires the use of such a silicone composition under more severe conditions. In particular, there is the demand for improving the durability of adhesion.

In the field of gas sealants for automobile, the range of their application is extended, so that the properties such as resistances to engine oil and LLC are required to be more improved.

Other industrial fields in which room temperature vulcanizable silicone compositions are applied include, for example, the field of a releasing agent which is used as a coating for rolls in copying machines. Since full color copies are increasing in number wherein color shift in image has to be prevented, it is necessary to further improve the releasing properties of rolls for copying machine.

To impart practical mechanical strength of the room temperature vulcanizable silicone composition, the usual practice is to use an aerosil silica filler for reinforcement along with diorganopolysiloxane.

Typical examples of the silica filler include fumed silica which has been treated with trimethylchlorosilane or hexamethyldisilazane, or fumed silica which has been treated with dimethyldichlorosilane or dimethylpolysiloxane.

However, the use of these fillers is not satisfactory in obtaining characteristic properties, such as resistances to hot water, oil and LLC, which are recently strongly demanded in the art.

The silicone rubber compositions of the type stated above are described, for example, in Japanese Patent Publication Nos. 47-30422 and 40-19178. Japanese Patent Publication No. 47-30422 describes a silicone rubber composition which comprises a hydrophobic silica filler having the surface blocked with triorganosiloxy groups of the unit formula, $R_3SiO_{0.5}$, in which R is a monovalent hydrocarbon group, and an organopolysiloxane of which the molecular chain terminals are blocked each with a silanolic hydroxyl group.

Japanese Patent Publication No. 40-19178 describes a silicone rubber composition which comprises a reinforcing filler, an organopolysiloxane having silicon-bonded vinyl groups at the molecular chain terminals and a nitrogen-containing organosilicon compound.

SUMMARY OF THE INVENTION

It is accordingly an object of the invention to provide a room temperature vulcanizable silicone rubber composition which has a wide utility in various fields and which comprises a silica filler treated with a monoorganosilane or monoorganopolysilazane whereby the characteristics of the silicone rubber composition are improved over those of known compositions.

It is another object of the invention to provide a room temperature vulcanizable silicone rubber composition which is improved in resistances to hot water, oil, LCC and the like over known counterparts, without sacrificing mechanical strength.

The above objects can be achieved, according to the invention, by a room temperature vulcanizable silicone rubber composition which comprises:

(1) 100 parts by weight of an organopolysiloxane which is blocked with a hydroxyl group or hydrolyzable group at both ends of a molecular chain thereof;

(2) from 1 to 40 parts by weight of fumed silica which is surface treated with a monoorganosilane of the general formula, $R^1SiY_3$, or a monoorganopolysilazane of the general compositional formula, $R^1Si(NH)_{3/2}$, wherein each $R^1$ represents a monovalent hydrocarbon group having from 1 to 3 carbon atoms, each Y represents a hydrolyzable group and which has a specific surface area of not less than 50 m$^2$/g; and (3) from 0.5 to 30 parts by weight of an organosilicon compound of the general formula, $R^2{}_6SiZ_{4-6}$ b, wherein $R^2$ represents an unsubstituted or substituted monovalent hydrocarbon group having from 1 to 10 carbon atoms, Z represents a hydrolyzable group, and 6 is a value of 0 or 1, or its partially hydrolyzed product. The composition may further comprise a promoter for vulcanization preferably in an amount of from 0.01 to 5 parts by weight based on the 100 parts of the first ingredient (1).

DETAILED DESCRIPTION AND EMBODIMENTS OF THE INVENTION

Figure 1:
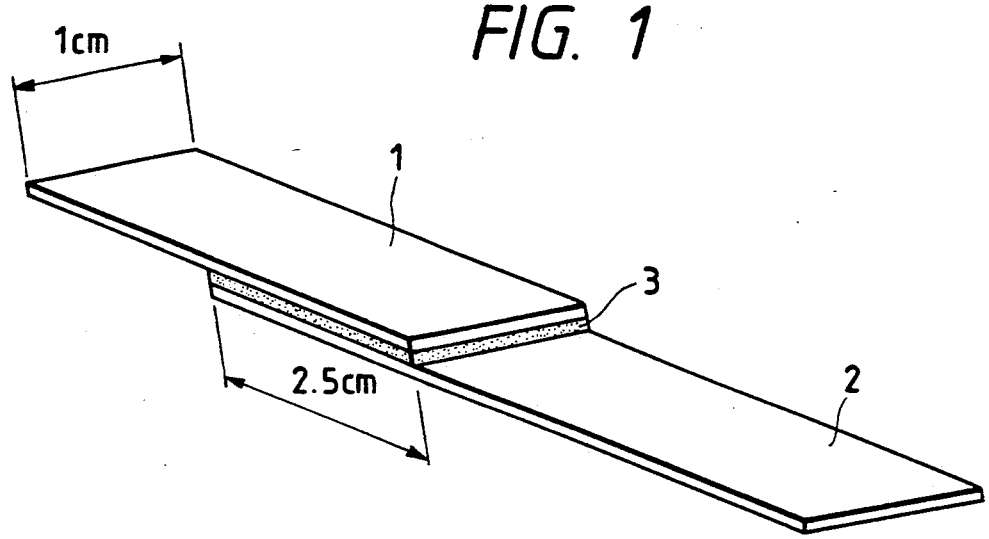
FIG. 1 is a perspective view illustrating an adhesion test used in Example 6 and Comparative Examples 4 and 5.

A typical organopolysiloxane used as the first ingredient of the composition of the invention which has a hydroxyl group or hydrolyzable group at the ends of the molecular chain is a diorganopolysiloxane of the following general formula

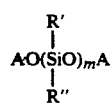

wherein A represents a hydrogen atom or

in which $R^3$ represents a methyl group, an ethyl group, a propyl group, a phenyl group, a vinyl group, an allyl group or a 3,3,3-trifluoropropyl group and n is a value of 0 or 1, and X represents a lower alkoxy group having from 1 to 5 carbon atoms, such as a methoxy group, an ethoxy group, a propoxy group, a butoxy group, a methoxyethoxy group, an ethoxyethoxy group or the like, an acyloxy group having from 2 to 5 carbon atoms, such as an acetoxy group, a propionoxy group, a butyroxy group or the like, a ketoxime group having from 3 to 6 carbon atoms, such as a dimethylketoxime group, a diethylketoxime group, a methylethylketoxime group, a cyclopentanoxime, a cyclohexanoxime group or the like, an alkenyloxy group having from 2 to 6 carbon atoms, such as a vinyloxy group, an allyloxy group, an isopropenyloxy group, an isobutenyloxy group or the like, or an amido group, an amino group or aminoxy group each having from 1 to 5 carbon atoms, R' and R" independently represent an alkyl group having from 1 to 8 carbon atoms such as a methyl group, an ethyl group or a propyl group, a cycloalkyl group having from 5 to 8 carbon atoms, such as a cyclohexyl group, an alkenyl group having from 2 to 6 carbon atoms such as a vinyl group, an allyl group or the like, an aryl group having from 6 to 10 carbon atoms, such a phenyl group, a tolyl group or the like, or those groups mentioned above but substituted partially with a halogen atom or the like at the hydrogen atom, such as a 3,3,3-trifluoro group, and m is an integer of not smaller than 10. The diorganopolysiloxane should have a viscosity at 25° C. of from 25 to 500,000 cs, preferably from 1,000 to 100,000 cs. To attain this, m in the above formula should be an integer of not smaller than 10, preferably from 10 to 1,000.

The second ingredient which is fumed silica surface-treated with a monoorganosilane of the general formula, $R^1SiY_3$, or a monoorganopolysilazane of the general compositional formula, $R^1Si(NH)_{3/2}$, is the most important in the composition of the present invention.

In the above formula, $R^1$ in each formula represents a monovalent hydrocarbon group having from 1 to 3 carbon atoms. Examples of the monovalent hydrocarbon group include a methyl group, an ethyl group, a propyl group, an iso-propyl group, a vinyl group, an allyl group and the like. Of these, the alkyl group is preferred. More preferably, the methyl group is used. In the formula, each Y represents a hydrolyzable group. Examples of the hydrolyzable group include a halogen atom such as chlorine, bromine or iodine, and an alkoxy group having from 1 to 5 carbon atoms, such as a methoxy group, an ethoxy group, a propoxy group, a butoxy group, a methoxyethoxy group, an ethoxyethoxy group or the like. Specific and preferable examples of the monoorganosilane include methyltrichlorosilane, methyltrimethoxysilane, methyltriethoxysilane, methylpolysilazane and the like. The monoorganopolysilazane of the general formula, $R^1Si(NH)_{3/2}$, is readily obtained by reaction between the monoorganosilane defined above and ammonia. A typical and preferable example includes monomethylpolysilazane.

The surface-treated fumed silica, which has been blocked at the silanol groups on the surface with the $R^1SiO_{3/2}$ units, is obtained by thermally treating hydrophilic fumed silica with such a monoorganosilane or monoorganopolysilazane as indicated above, thereby rendering the silica hydrophobic. The silane or polysilazane is used or deposited in such an amount that the treated hydrophobic silica has a content of carbon derived from the silane or polysilazane ranging from 0.5 to 5 wt %, preferably from 1.5 to 3 wt %, based on the treated silica. If the content is less than 0.5 wt %, satisfactory hydrophobic properties cannot be obtained. Over 5 wt %, a difficulty is encountered in preparing treated silica having such a large amount of the silane or polysilazane deposited thereon. The content of the carbon derived from the silane or polysilazane can be determined using an ordinary carbon analyzer for metal. In view of the reinforcement for the composition, the specific surface area of the surface-treated silica should preferably be in the range of from 50 to 800 m²/g, more preferably from 100 to 400 m²/g. This type of hydrophobic silica is available, for example, under the name of MT-10 from Tokuyama Soda Co., Ltd.

The amount of the silica used as the second ingredient should be in the range of from 1 to 50 parts by weight per 100 parts by weight of the organopolysiloxane used as the first ingredient. If the amount is less than 1 parts by weight, an appreciable reinforcing effect cannot be expected. Over 50 parts by weight, the composition becomes so viscous that it does not flow satisfactorily.

The organosilicon compound used as the third ingredient and represented by the general formula, $R^2_6SiZ_{4-6}$, is a crosslinking agent for vulcanizing the composition of the invention. In the above formula, $R^2$ represents an unsubstituted or substituted monovalent hydrocarbon group, Z represents a hydrolyzable group and 6 is a value of 0 or 1.

The unsubstituted or substituted monovalent hydrocarbon groups include, for example, those defined with respect to R' and R" in the formula of the first ingredient as having from 1 to 10 carbon atoms. The hydrolyzable groups used above may be those defined with respect to X in the formula of the first ingredient and include, for example, an alkoxy having from 1 to 5 carbon atoms, such as a methoxy group, an ethoxy group or the like, an oxime group having from 3 to 6 carbon atoms, such as a propanoxime group, a butanoxime group, a pentanoxime group, a cyclohexanoxime group or the like, an amino group such as a butylamino group, a cyclohexylamino group or the like, an acyloxy group such as an acetoxy group, and an alkenyloxy group an isopropenyloxy group.

Specific examples of the organosilicon compound include alkoxysilanes such as methyltrimethoxysilane, vinyltrimethoxysilane, phenyltrimethoxysilane, methyltriethoxysilane, tetramethoxysilane, tetraethoxysilane and the like; oximsilanes such as methyltri(butanoxim)silane, vinyltri(butanoxim)silane, phenyltri(butanoxim)silane, propyltri(butanoxim)silane, tetra(butanoxim)silane, 3,3,3-trifluoropropyl(butanoxim)silane, 3-chloropropyl(butanoxim)silane, methyltri(propanoxim)silane, methyltri(pentanoxim)silane, methyltri(isopentanoxim)silane, vinyltri(cyclopentanoxim)silane, methyltri(cyclohexanoxime)silane and the like; aminosilanes such as methyl-tris(N-butylamino)silane, ethyl-tris(N-butylamino)silane, phenyl-tris(N-butylamino)silane, vinyl-tris(N-butylamino)silane, tetra(cyclohexylamino)silane and the like; carboxylic acid (acyloxy) silanes such as methyltriacetoxysilane, ethyltriacetoxysilane, phenyltriacetoxysilane, vinyltriacetoxysilane, γ-trifluoropropyltriacetoxysilane, tetraacetoxysilane, tetraoctoatesilane and the like; and alkenyloxysilanes such as methyltriisopropenyloxysilane, vinyltriisopropenyloxysilane, phenyltriisopropenylsilane and the like. These vulcanizing agents may be used singly or in combination. Alternatively, partially hydrolyzed products obtained from these compounds may be used.

The vulcanizing agent used as the third ingredient is generally employed in an amount of from 0.5 to 3 parts by weight, preferably from 2 to 10 parts by weight, per 100 parts by weight of the first ingredient. If the amount is less than 0.5 parts by weight, a satisfactorily vulcanized product is difficult to obtain. Over 30 parts by weight, physical properties of the resulting product become poorer.

The composition of the invention may further comprise a catalyst for promoting the vulcanization.

Such promoters for vulcanization may be those which have been ordinarily used for the type of composition to which the present invention is directed. Examples of the promoter include: metal salts of organic carboxylic acids such as lead 2-ethyloctoate, dibutyltin octoate, dibutyltin diacetate, dibutyltin dilaurate, butyltin-2-ethylhexoate, iron-2-ethylhexoate, cobalt-2-ethylhexoate, manganese-2-ethylhexoate, zinc-2-ethylhexoate, stannous caprylate, tin naphthenate, tin oleate, tin butyrate, titanium naphthenate, zinc naphthenate, cobalt naphthenate, zinc stearate and the like; organic titanic acid esters such as tetrabutyl titanate, tetra-2-ethylhexyl titanate, triethanolamine titanate, tetra(isopropenyloxy) titanate and the like; organotitanium compounds such as organosiloxy titanium, $\beta$-carbonyl titanium and the like; alkoxyaluminium compounds; aminoalkyl group-substituted alkoxysilanes such as 3-aminopropyltriethoxysilane, N-(trimethoxysilylpropyl)ethylenediamine and the like; amine compounds and salts thereof such as hexylamine, dodecylamine phosphate and the like; alkali metal salts of lower aliphatic acids such as potassium acetate, sodium acetate, lithium oxalate and the like; dialkylhydroxyamines such as dimethylhydroxyamine, diethylhydroxyamine and the like; guanidine compounds and guanidyl group-containing silanes or siloxanes of the following formulae

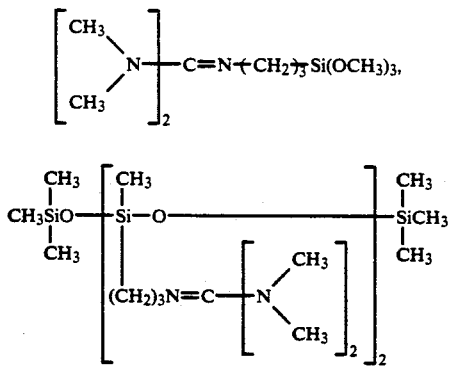

These compounds may be used singly or in combination.

The promoter may not be used at all although depending on the type of organosilicon compound used as the third ingredient and particularly, the type of hydrolyzable group bonded to the silicon atom of the organosilicon compound. Preferably, the promoter is used in an amount of from 0.01 to 5 parts by weight, more preferably from 0.1 to 3 parts by weight, per 100 parts by weight of the first ingredient. If the promoter is not used at all or is used only in a small amount, it may take a long time before completion of the vulcanization and if the composition is applied as thick, a difficulty may be involved in uniform vulcanization to the inside. On the other hand, when the promoter is used in larger amounts, a time required for the vulcanization becomes very short, with various inconveniences in handling of the composition. In addition, the resultant vulcanized product deteriorates in heat resistance and weatherability.

The composition of the invention is obtained by mixing the ingredients (1) to (3) and, optionally, the promoter for vulcanization by a usual manner. For instance, the first and second ingredients are preliminarily uniformly mixed, to which the third ingredient and, if necessary, a promoter for the vulcanization are added, thereby obtaining a composition.

If necessary, the composition of the invention may further comprise additives such as plasticizers, colorants such as pigments, flame retardants, thixotropic agents, bactericides, moldproofing agents, adhesion improvers such as so-called carbon functional silanes having amino, epoxy and thiol groups, and other fillers. When used, these additives are added in amounts not impeding the inherent properties of the composition of the invention.

The composition of the invention may be supplied as a so-called one-pack type wherein it is filled in a closed vessel or container such as a cartridge or tube and forced out from the container in use. Alternatively, there may be used a two-pack type where the vulcanizable organosiloxane ingredient and an ingredient containing the vulcanizing agent are packed separately and these ingredients are mixed together immediately before use.

The silicone rubber composition of the invention may be applied to wide fields of sealing materials for building, adhesives, sealants for gasket of automobiles, surface coating agents for rolls of office machines and the like. Since the silica treated with a monoorganosilane on the surface thereof is used as a filler in the composition of the invention, the resistances to hot water, oil and LLC are improved without impeding mechanical strength of the vulcanized product obtained from the composition. Accordingly, the composition is applicable not only to a newly developed technique such as a structure glazing technique, but also to new applications as a sealant for water or gasket of automobiles.

The present invention is more particularly described by way of examples, which should not be construed as limiting the invention. In the examples and comparative examples, parts are by weight unless otherwise specified, and fumed silica is surface treated with the respective compounds in such a way that the content of carbon derived from the compound used as a surface treating agent is about 2.0 wt % of the treated silica as determined using a carbon analyzer for metal.

EXAMPLES 1 to 5

100 parts of dimethylpolysiloxane having a viscosity of 20,000 cs and blocked with a dimethylsilanol group at both ends of the molecular chain was mixed with fumed silica, which had been surface-treated with methyltrichlorosilane and had a specific surface area of 200 m²/g, in amounts indicated in Table 1, thereby obtaining bases. To these bases were added vulcanizing agents and promoters in amounts indicated in Table 1 to obtain compositions. The respective compositions were formed into 2 mm thick sheets, followed by vulcanization under conditions of 20° C. and a relative humidity of 55% for 7 days. The resultant vulcanized products were each subjected to measurements of initial rubber physical properties, physical properties (oil resistance) after immersion of the products in a motor oil (Toyota Pure Castle Motor Oil 10W-30) heated to 140° C. for 10 days, and physical properties (LLC resistance) after immersion in a long life coolant (Toyota Pure Long Life Coolant, diluted to 50 wt % with water) at 120° C. for 14 days. The physical properties including hardness, tensile strength and elongation were measured by the methods prescribed in JIS-K-6301. The results of the measurements are shown in Table 2. These results reveal that the cured products of the compositions of the invention are very excellent in the oil resistance and LLC resistance.

TABLE 1

| Ingredients | Example No. | | | | |
|---|---|---|---|---|---|
| | 1 | 2 | 3 | 4 | 5 |
| dimethylpolysiloxane (parts) | 100 | 100 | 100 | 100 | 100 |
| fumed silica (treated with methyltrichlorosilane) (parts) | 10 | 15 | 15 | 20 | 20 |
| methyltriacetoxysilane (parts) | 5 | — | — | — | — |
| methyltrimethylethylketo-oximsilane (parts) | — | 6 | — | 6 | — |
| vinyltriisopropenoxysilane (parts) | — | — | 6 | — | 6 |
| dibutyltin dimaleate (parts) | 0.1 | 0.2 | — | 0.3 | — |
| tetramethylguanidino-propyltrimethoxysilane (parts) | — | — | 0.5 | — | 0.7 |

TABLE 2

| Physical Properties | Example No. | | | | |
|---|---|---|---|---|---|
| | 1 | 2 | 3 | 4 | 5 |
| Initial Characteristics: | | | | | |
| hardness (JIS-A) | 20 | 28 | 25 | 35 | 32 |
| tensile strength (kgf/cm$^2$) | 16 | 22 | 23 | 33 | 35 |
| elongation (%) | 350 | 400 | 460 | 510 | 580 |
| Oil Resistance: | | | | | |
| hardness (JIS-A) | 16 | 25 | 20 | 29 | 26 |
| tensile strength (kgf/cm$^2$) | 13 | 19 | 20 | 28 | 26 |
| elongation (%) | 400 | 480 | 510 | 600 | 660 |
| LLC Resistance: | | | | | |
| hardness (JIS-A) | 14 | 20 | 20 | 31 | 27 |
| tensile strength (kgf/cm$^2$) | 10 | 15 | 17 | 22 | 20 |
| elongation (%) | 300 | 400 | 430 | 480 | 450 |

COMPARATIVE EXAMPLES 1 to 3

In the same manner as in Example 1 using compositions indicated in Table 3, there were obtained vulcanized products, followed by measurements of the initial physical properties and the physical properties for the oil and LLC resistances in the same manner as in Example 1. The results are shown in Table 4. From these results, it will be seen that the oil and LCC resistances are significantly poorer than those of vulcanized products obtained from the compositions of the present invention.

TABLE 3

| Ingredients | Comparative Example No. | | |
|---|---|---|---|
| | 1 | 2 | 3 |
| dimethylpolysiloxane (parts) | 100 | 100 | 100 |
| fumes silica (parts) | 15 | 15 | 15 |
| surface treating agent for silica | *1 | *2 | *3 |

TABLE 3-continued

| Ingredients | Comparative Example No. | | |
|---|---|---|---|
| | 1 | 2 | 3 |
| methyltriacetoxysilane (parts) | 5 | — | — |
| methyltrimethylethylketo-oximsilane (parts) | — | 6 | — |
| vinyltriisopropenoxysilane (parts) | — | — | 6 |
| dibutyltin dimaleate (parts) | 0.1 | 0.2 | — |
| tetramethylguanidino-propyltrimethoxysilane (parts) | — | — | 0.5 |

Note
*1: trimethylchlorosilane
*2: dimethyldichlorosilane
*3: hexamethyldisilazane

TABLE 4

| Physical Properties | Comparative Example No. | | |
|---|---|---|---|
| | 1 | 2 | 3 |
| Initial Characteristics: | | | |
| hardness (JIS-A) | 29 | 31 | 26 |
| tensile strength (kgf/cm$^2$) | 23 | 25 | 25 |
| elongation (%) | 430 | 450 | 500 |
| Oil Resistance: | | | |
| hardness (JIS-A) | 8 | 6 | 6 |
| tensile strength (kgf/cm$^2$) | 4 | 4 | 3 |
| elongation (%) | 80 | 70 | 70 |
| LLC Resistance: | | | |
| hardness (JIS-A) | 10 | 23 | 11 |
| tensile strength (kgf/cm$^2$) | 1 | 2 | 1 |
| elongations (%) | 50 | 150 | 60 |

EXAMPLE 6 AND COMPARATIVE EXAMPLES 4, 5

Compositions with the formulations indicated in Table 5 were prepared in the same manner as in Example 1.

Thereafter, the respective compositions were applied to adherends 1 and 2, as shown in FIG. 1, in a thickness of the adhesive composition layer of 2 mm with an adhesion area of 25 cm$^2$ and vulcanized by allowing to stand under conditions of 20° C. and a relative humidity of 55% for 7 days. Thus, adhesion test samples corresponding to the respective compositions were obtained. These samples were subjected to measurements of adhesion strength under shear and cohesive failure rate. Moreover, the test samples were each immersed in hot water at 50° C. for one month and subjected to similar measurements. The results are shown in Table 6. From the table, it will be seen that the composition of the invention are significantly better in the hot water resistance than the compositions for comparison. This gives evidence that the hot water resistance depends greatly on the type of surface treating agent for silica and that methyltrichlorosilane gives the best results.

TABLE 5

| Ingredients | Ex. 6 | Comp. Ex. 4 | Comp. Ex. 5 |
|---|---|---|---|
| dimethylpolysiloxane having silanol end groups (20,000 cs.) (parts) | 100 | 100 | 100 |
| fumed silica (parts) | 15 | 15 | 15 |
| surface treating agent for silica | *1 | *2 | *3 |
| vinyltri(methylethylketoxim) silane (parts) | 8 | 8 | 8 |
| dibutyltin dioctate (parts) | 0.1 | 0.1 | 0.1 |
| γ-aminopropyltriethoxysilane | 0.5 | 0.5 | 0.5 |

TABLE 5-continued

| Ingredients (parts) | Ex. 6 | Comp. Ex. 4 | Comp. Ex. 5 |
|---|---|---|---|

Note
*1: methyltrichlorosilane
*2: dimethyldichlorosilane
*3: hexamethyldisilazane

TABLE 6

Adhesion Strength Under Shear

| | Example 6 | | Comp. Ex. 4 | | Comp. Ex. 5 | |
|---|---|---|---|---|---|---|
| Adherend | Initial St. | One month After Immersion in Water at 50° C. | Initial St. | One month After Immersion in Water at 50° C. | Initial St. | One month After Immersion in Water at 50° C. |
| glass | 13 | 10 | 13 | 5 | 12 | 3 |
| aluminium | 14 | 12 | 13 | 6 | 12 | 4 |
| ABS resin | 14 | 11 | 12 | 5 | 13 | 3 |
| vinyl chloride resin-coated steel sheet | 12 | 10 | 13 | 4 | 13 | 2 |

EXAMPLE 7 AND COMPARATIVE EXAMPLES 6, 7

Compositions having such formulations as indicated in Table 7 were prepared in the same manner as in Example 1.

TABLE 7

| Ingredients | Ex. 7 | Comp. Ex. 6 | Comp. Ex. 7 |
|---|---|---|---|
| dimethylpolysiloxane having silanol end groups (20,000 cs.) (parts) | 100 | 100 | 100 |
| fumed silica (parts) | 20 | 20 | 20 |
| surface treating agent for silica | *1 | *2 | *3 |
| methyltriacetoxysilane (parts) | 8 | 8 | 8 |
| dibutyltin dilaurate (parts) | 0.1 | 0.1 | 0.1 |
| $(CH_3COO)_2Si\underset{\underset{O_{(t)}Bu}{|}}{\overset{\overset{O_{(t)}Bu}{|}}{-}}OC_2H_4OSi(OCOCH_3)_2$ (parts) | 0.5 | 0.5 | 0.5 |

Figure 2:
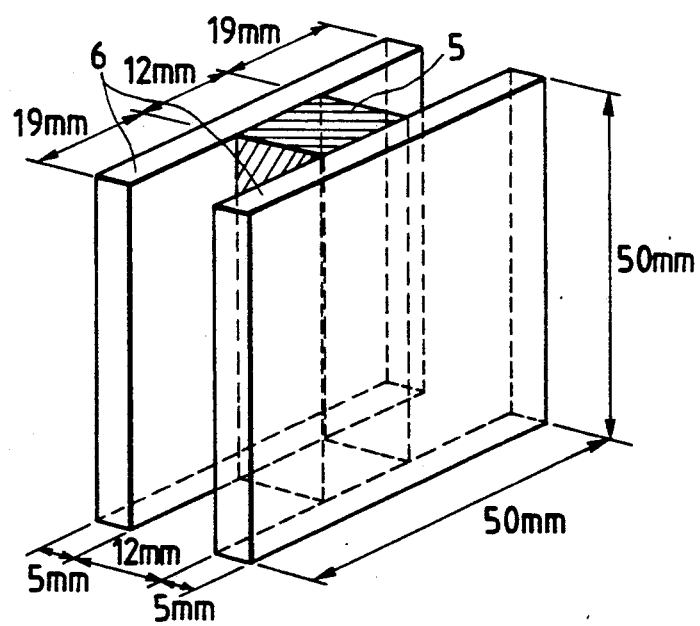
FIG. 2 is a schematic view of an H-shaped block as defined in JIS-A5758 used in Example 7 and Comparative Examples 6 and 7.

Note *1: methyltrichlorosilane
*2: dimethyldichlorosilane
*3: hexamethyldisilazane Subsequently, the compositions were each used to make an H-shaped block as prescribed in JIS-A5758. This is particularly shown in FIG. 2. In the figure, a sample 5 obtained from the respective compositions is sandwiched between 5 mm thick glass plates 6 and vulcanized under conditions of 23° C. and a relative humidity of 55% for 7 days and then at a temperature of 30° C.±3° C. for 7 days. The H-shaped blocks were used for pull adhesion strength tests.

The H-shaped block samples obtained in this manner were subjected to measurements of initial physical properties and those properties after immersion in hot water at 80° C. for 1 month in order to determine waterproofing properties of the vulcanized compositions. The results are shown in Table 8 below.

TABLE 8

| Physical Properties | Ex. 7 | Comp. Ex. 6 | Comp. Ex. 7 |
|---|---|---|---|
| Initial properties: | | | |
| tensile strength at 50% elongation (kgf/cm²) | 8.0 | 7.5 | 7.0 |
| maximum tensile strength (kgf/cm²) | 12.0 | 11.0 | 10.5 |
| maximum elongation (%) | 130 | 125 | 110 |
| After immersion in water at 80° C. for 1 month: | | | |
| tensile strength at 50% elongation (kgf/cm²) | 7.5 | 7.0 | — |
| maximum tensile strength (kgf/cm²) | 12.6 | 9.8 | 5.5 |
| maximum elongation (%) | 150 | 70 | 30 |

As will become apparent from the results of Table 8, the composition of the invention is significantly better in the hot water resistance than the compositions for comparison. Evidence is given that the type of surface treating agent greatly influences the hot water resistance of cured product and that methyltrichlorosilane is excellent as the surface treating agent.

What is claimed is:

1. A room temperature vulcanizable silicone rubber composition which comprises:
   (1) 100 parts by weight of an organopolysiloxane which is blocked with a hydroxyl group or hydrolyzable group at both ends of a molecular chain thereof;
   (2) from 1 to 40 parts by weight of fumed silica which is surface treated with a monoorganosilane of the general formula $R^1SiY_3$, wherein $R^1$ represents a monovalent hydrocarbon group having from 1 to 3 carbon atoms, each Y represents a halogen atom and which has a specific area of not less than 50 m²/g; and
   (3) from 0.5 to 30 parts by weight of an organosilicon compound of the general formula, $R^2{}_bSiZ_{4-b}$ wherein $R^2$ represents an unsubstituted or substituted monovalent hydrocarbon group having from 1 to 10 carbon atoms, Z represents a hydrolyzable group, and b has a value of 0 or 1, or its partially hydrolyzed product.

2. The composition according to claim 1, wherein said organopolysiloxane is a diorganopolysiloxane of the following general formula

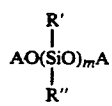

wherein A represents a hydrogen atom or

in which $R^3$ represents a methyl group, an ethyl group, a propyl group, a phenyl group, a vinyl group, an allyl group or a trifluoropropyl group and n is a value of 0 or 1, and X represents a lower alkoxy group having from 1 to 5 carbon atoms, an acyloxy group having from 2 to 5 carbon atoms, a ketoxime group having from 3 to 6 carbon atoms, an alkenyloxy group having from 2 to 6 carbon atoms, an amino group or aminoxy group, R' and R" independently represent an alkyl group having from 1 to 8 carbon atoms, a cycloalkyl group having from 5 to 8 carbon atoms, an alkenyl group having from 2 to 6 carbon atoms, or an aryl group from 6 to 10 carbon atoms, the R' and R" groups defined above being unsubstituted or partially substituted with a halogen atom and m is an integer of not smaller than 10.

3. The composition according to claim 2, wherein m in the general formula is an integer from 10 to 1,000 so that said organopolysiloxane has a viscosity at 25° C. of 1,000 to 100,000 cs.

4. The composition according to claim 1, wherein $R^1$ for the monoorganosilane is an alkyl group having from 1 to 3 carbon atoms.

5. The composition according to claim 4, wherein said alkyl group is a methyl group.

6. The composition according to claim 1, wherein said fumed silica is surface treated with the monoorganosilane.

7. The composition according to claim 6, wherein said monoorganosilane is methyltrichlorosilane.

8. The composition according to claim 1, wherein said fumed silica is surface treated with the monoorganosilane in such a way that the content of carbon derived from the monoorganosilane is in the range of from 0.5 to 5 wt % based on the treated silica.

9. The composition according to claim 1, wherein the fumed silica which has been surface treated has a specific surface area of from 50 to 800 m²/g when determined by the BET method.

10. The composition according to claim 1, which further comprises a promoter for vulcanization in an amount of from 0.01 to 5 parts by weight based on the 100 parts of the organopolysiloxane which is the first ingredient.

11. A vulcanized product of the composition of claim 1.

* * * * *